E. WEINHEIM.
APPARATUS FOR THE MANUFACTURE OF SUBSTITUTE HIDE LEATHER.
APPLICATION FILED FEB. 9, 1918.
1,305,848.
Patented June 3, 1919.
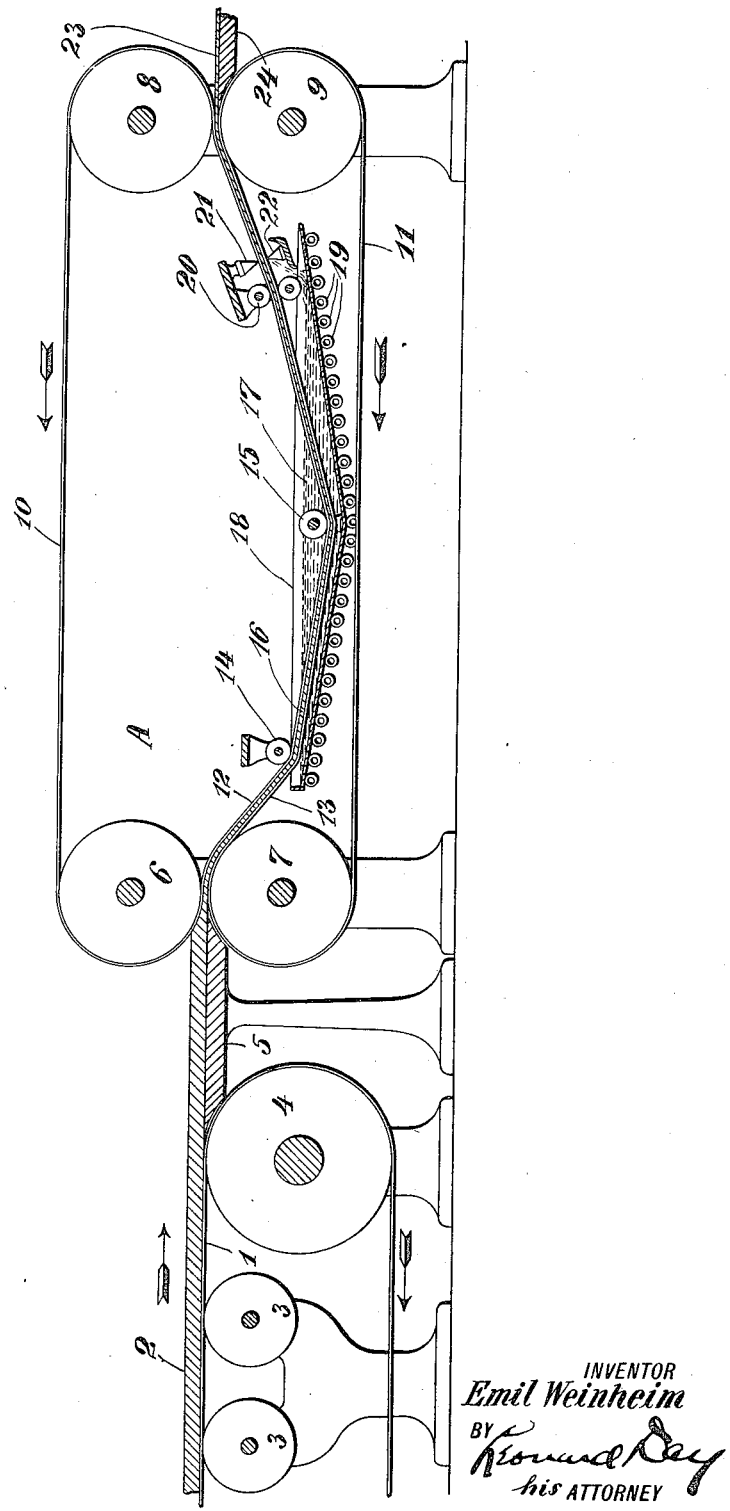

UNITED STATES PATENT OFFICE.

EMIL WEINHEIM, OF NEW YORK, N. Y.

APPARATUS FOR THE MANUFACTURE OF SUBSTITUTE HIDE-LEATHER.

1,305,848.   Specification of Letters Patent.   Patented June 3, 1919.

Application filed February 9, 1918.   Serial No. 216,318.

*To all whom it may concern:*

Be it known that I, EMIL WEINHEIM, a citizen of the United States, and a resident of New York city, county, and State of New York, have invented certain new and useful Improvements in Apparatus for the Manufacture of Substitute Hide-Leather, set forth in the following specification.

This invention relates to apparatus for the manufacture of substitute hide leather,— the type of leather suitable for shoe soles and belting.

The object of the invention is to produce an artificial product very closely resembling animal hide leather and at the same time being much cheaper to produce than the natural product.

A further object of the invention is to make possible the manufacture of this product by a continuous operation in contra-distinction to the manufacture of individual sheets of relatively small dimensions limited by the face area of presses.

To the above end a feature of my invention is the employment of two endless traveling aprons, extensive portions of which travel in parallel relation and serve as carriers and binders for a continuous strip of my product during the course of its manufacture.

The above and further details of my invention will better be understood by reference to the following specification which is directed to an illustrative embodiment of suitable apparatus shown in the accompanying drawings, which form a part hereof and in which the single figure is a vertical section, principally in diagram, of novel apparatus suitable for practising my invention.

I preferably employ for the production of my body fabric a mixture of fibers, cotton fibers, short clean cattle hair, and the clean hair of the cheaper furs. My body fabric may, however, comprise solely cotton fibers or solely animal hair, although I prefer to employ a mixture of cotton fibers and animal hair. The thoroughly cleaned material for the body fabric is first run through a batting machine, sometimes called a garneting machine, of the standard type employed for making batts or soft felts for mattresses. A suitable type of batting machine for the first step in my process is the garneting machine manufactured by Smith & Furbush Machine Co., Philadelphia, Pa.

In the drawings 1 indicates the delivery apron from a standard type of garneting machine or it may be an auxiliary apron picking up the batt 2 delivered from a standard garneting machine In any event, I prefer that this apron 1 pass over a plurality of heated rollers 3 for the purpose of driving moisture out of the batt 2. The power driven drum 4 may also be steam heated for the same purpose. At the delivery end of the apron 1 is a table 5, the top of which should be polished and should lie in the plane of the apron 1 so as to deliver the batt 2 to my permeating machine A. The machine A comprises two horizontally spaced sets of power driven steam-heated drums 6, 7 and 8, 9. One endless apron 10 is driven by the drums 6 and 8 and a second endless apron 11 is driven by the drums 7 and 9. The lower loop 12 of the apron 10 and the upper loop 13 of the apron 11 travel close together and in parallel relation, these portions progressively coming together between the drums 6 and 7, at which locality the batt 2, formed in any desired thickness in accordance with the thickness desired for the finished product, is caught and pinched between the aprons and dragged downward and to the right, as viewed in the diagram.

Each of the endless aprons 10 and 11 is preferably formed of perforated sheet metal, perforated sheet zinc being suitable. In fact, any material which is capable of withstanding great pressure without distortion while at the same time it is subjected to heat at a temperture approximating 200° Fahrenheit is suitable.

The contiguous portions 12 and 13 of these endless aprons are then carried beneath an idler 14 and thence under a second one or more idlers 15, which serve the purpose of carrying the aprons, together with the intermediate layer 16 of body fabric, through and beneath a suitable leatherfying dope 17, contained in the tank 18. The dope 17 may be any of the well-known leatherfying dopes such as that having a pyroxaline base or such as that having a partially oxidized oil base, but preferably the type of dope described in my copending application, Serial No. 201,989, filed Nov. 14, 1917, for a solvent reclamation in manufacturing substitute leather. The dope 17 in the tank 18 is maintained at the temperature of approximately 200° Fahrenheit by suitable steam coils 19. Just before passing beyond the confines of the tank 18 the aprons 10 and 11, together with the intermediate layer of saturated body fabric, are passed between a suitable number of squeegee rollers 20, the purpose of which is to squeeze out any surplus of leatherfying dope in the fabric 16. After passing through the squeegee rollers, any dope adhering to the surface of the aprons 10 and 11 is scraped off by scrapers 21 and 22 at such a locality that it will flow back into the tank 18. It is of course to be understood that the dope in the tank 18 should be constantly replenished at the rate at which dope is absorbed by the fabric in the course of its manufacture. The aprons 10 and 11 deliver the completely saturated fabric 23 upon the surface of a polished table 24, from which it slides continuously into a calendering machine of the type illustrated and described in my copending application for patent, Serial No. 130,930, filed Nov. 11, 1916, for a method of completely impregnating textile fabric with filling material. The calender rolls of such a machine knead the product thoroughly and determine its ultimate thickness in accordance with the spacing between the said calender rolls. After the calendering the product is preferably subjected to a blast of dry, conditioned air and the curing is completed preferably by hanging the product in festoons in a drying room supplied with dry conditioned air.

What I claim and what I desire to secure by United States Letters Patent is:—

In apparatus for manufacturing substitute hide leather, two endless non-compressible, metallic aprons having extensive portions contiguous and parallel one or both of which has or have perforations; means for feeding a fibrous batt between said contiguous portions; means for effecting a continuous forward movement of said contiguous portions to carry between them said fibrous batt; a dope-tank; means for guiding said contiguous portions through said dope-tank; squeegee rollers directly engaging the outer faces of said contiguous portions for indirect operation upon said fibrous batt; and scrapers for removing dope from said aprons.

In testimony whereof I have signed my name to this specification this 8th day of February, 1918.

EMIL WEINHEIM.